United States Patent [19]

Soper

[11] Patent Number: 5,113,289
[45] Date of Patent: May 12, 1992

[54] SHELF-MOUNTED MAGNIFYING GLASS

[76] Inventor: Sara Soper, 1978 Chester Ave., Abington, Pa. 19001

[21] Appl. No.: 637,614

[22] Filed: Jan. 4, 1991

[51] Int. Cl.$^5$ .............................................. G02B 7/02
[52] U.S. Cl. ...................................... 359/811; 359/813
[58] Field of Search ............... 350/114, 115, 116, 235, 350/241, 243, 245, 247, 250, 252, 256, 257; 359/440, 441, 442, 798, 806, 809, 811, 813, 817, 819, 827

[56] References Cited

U.S. PATENT DOCUMENTS

| | | | |
|---|---|---|---|
| 3,428,286 | 2/1969 | Del Pesco | 350/245 X |
| 3,758,217 | 9/1973 | Stokstad | 350/245 X |
| 3,774,993 | 11/1973 | Senee | 359/804 |
| 3,822,088 | 7/1974 | Steiner | 350/245 X |
| 3,955,884 | 5/1976 | Del Pesco, Sr. | 350/250 X |
| 4,037,940 | 7/1977 | Yates et al. | 350/247 X |
| 4,120,564 | 10/1978 | Rios | 350/247 X |
| 4,190,322 | 2/1980 | Wortley | 350/245 X |
| 4,457,585 | 7/1984 | DuCorday | 350/245 X |
| 4,712,870 | 12/1987 | Robinson et al. | 359/811 |
| 4,940,311 | 7/1990 | Buszek et al. | 350/245 |

Primary Examiner—Frank Gonzalez
Attorney, Agent, or Firm—H. Jay Spiegel

[57] ABSTRACT

Disclosed is a magnifying glass slideably mounted underneath a shelf. The intended environment of use of the present invention is a supermarket or other store having shelves supporting various articles of merchandise. When the print on a container of merchandise is small and thus difficult to read, the present invention may be slid from under the shelf so that it may be used to read the fine print on merchandise packaging.

7 Claims, 1 Drawing Sheet

SHELF-MOUNTED MAGNIFYING GLASS

BACKGROUND OF THE INVENTION

The present invention relates to a shelf-mounted magnifying glass. In the prior art, magnifying glasses, per se, are known. However, Applicant is unaware of any magnifying glass specifically mounted under a shelf and designed to be slid out from under the shelf when it is desired to use the magnifying glass. The following prior art is known to Applicant:

U.S. Pat. No. 3,774,993 to Senff discloses a fingernail inspection device including a base on which fingers may be placed and a magnifying glass pivotably mounted on the base. This is different from the teachings of the present invention wherein a magnifying glass is slidably mounted under a shelf.

U.S. Pat. No. 4,190,322 to Wortley discloses a magnifying glass mounted on a base through the use of a gooseneck type support. Again, this is different from the teachings of the present invention which contemplate a magnifying glass slideably mounted under a shelf.

U.S. Pat. No. 4,712,870 to Robinson et al. discloses a magnifying glass designed to be mounted above a display terminal such as a computer monitor. Again, this is different from the teachings of the present invention which contemplate the mounting of a magnifying glass in slideable fashion under a shelf.

SUMMARY OF THE INVENTION

The present invention relates to a shelf-mounted magnifying glass. The present invention includes the following interrelated aspects and features:

A) In a first aspect, the present invention consists of a magnifying glass mounted in a frame. The frame is intended to be slideably movable with respect to a pair of guiding devices.

B) The guiding devices, in the preferred embodiment of the present invention, consists of sideways U-shaped members designed to slideably receive side edges of the frame to allow slideable movement of the frame and the magnifying glass mounted therein with respect thereto.

C) In the preferred embodiment of the present invention, the sideways U-shaped members are intended to be mounted on the underside of a shelf, for example, a shelf in a store such as a supermarket or other merchandise selling facility.

D) In the intended use of the present invention, it is intended that a user slide the magnifying glass in the frame out from under the shelf when it is desired to use the magnifying glass to read the fine print on merchandise packaging.

Accordingly, it is a first object of the present invention to provide a shelf-mounted magnifying glass.

It is a further object of the present invention to provide such a device designed to be mounted on the underside of a shelf.

It is a still further object of the present invention to provide such a device which may be easily slid out from under the shelf when it is desired to read the fine print on merchandise.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
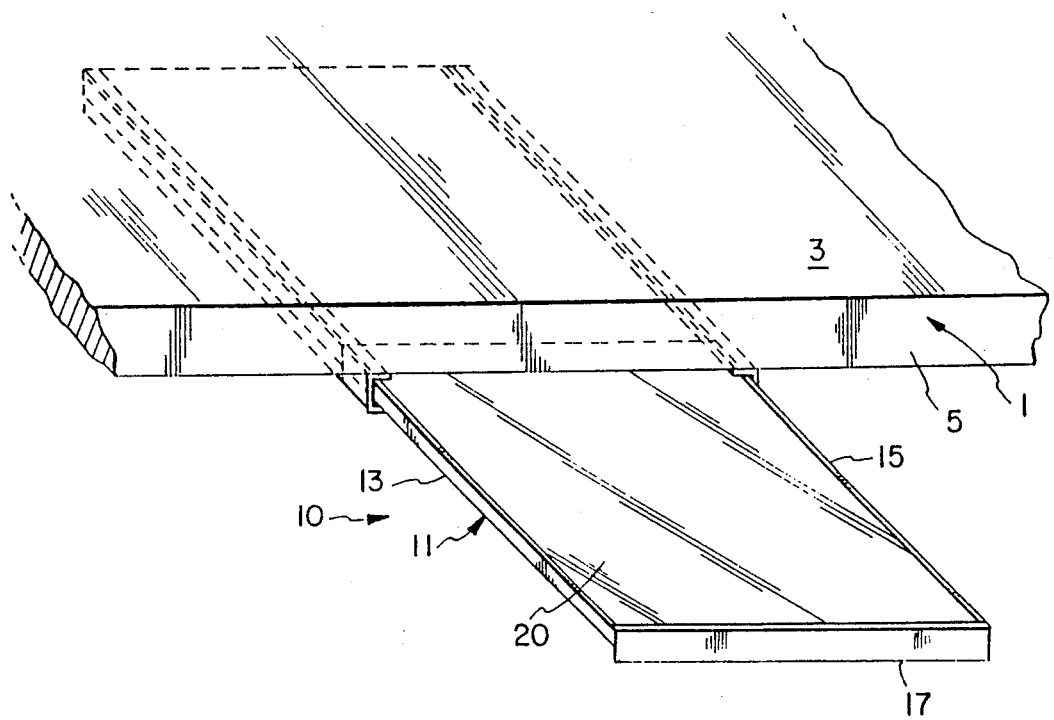
FIG. 1 shows a perspective view of the present invention.
Figure 2:
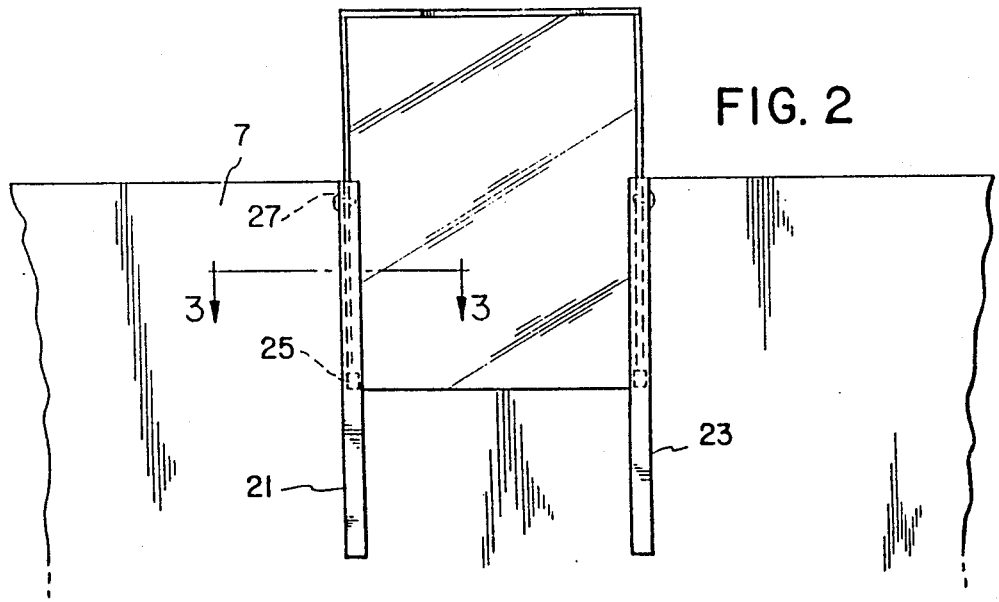
FIG. 2 shows a view looking from underneath the present invention.

With reference, first, to FIG. 1, a shelf is generally designated by the reference numeral 1 and is seen to include a top surface 3, a front wall 5 and an undersurface 7 (FIG. 2). The inventive shelf-mounted magnifying glass is generally designated by the reference numeral 10 and includes a frame 11 having side portions 13, 15 and a front portion 17 which extend below the magnifying glass. The front portion 17 can be used for advertising or instructions as well as a handle.

Within the frame 11, a magnifying glass 20 is mounted. The magnifying glass itself may be made in any known fashion and may be of any known type.

Figure 3:
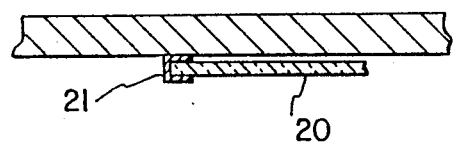
FIG. 3 shows a cross-sectional view along the line III—III of FIG. 2.

With particular reference to FIGS. 2 and 3, a pair of sideways U-shaped members 21, 23 are mounted on the undersurface 7 of the shelf in any suitable manner. As shown in FIG. 3, the U-shaped member 21 faces inwardly toward the frame 11 and magnifying glass 20. In correspondence with this, the U-shaped member 23 also faces inwardly toward the magnifying glass 20 and frame 11.

If desired, a stop mechanism may be provided to prevent complete removal of the magnifying glass 20 and frame 11 from the members 21, 23. In this regard, with reference to FIG. 2, it is seen that a projection 25 is provided on the frame 11 which may interact with a stop 27 on the member 21. The stop 27 may, if desired, comprise a screw which is threaded through an opening (not shown) in the member 21 so as to be in alignment with the projection 25 to prevent the frame 11 from being pulled completely out from under the shelf 1.

Through the use of the present invention, one may read the fine print on merchandise packaging as desired.

As such, an invention has been disclosed in terms of a preferred embodiment thereof which fulfills each and every one of the objects of the invention as set forth hereinabove and provides a new and useful shelf-mounted magnifying glass of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A shelf-mounted magnifying glass, comprising:
   a) guide means mounted on an undersurface of a shelf;
   b) a magnifying glass mounted on said guide means for movements with respect to said shelf;
   c) said magnifying glass having a first position located in a stored position under said shelf and moveable on said guide means to a second position exposed to view.

2. The invention of claim 1, wherein said magnifying glass has two sides.

3. The invention of claim 2, wherein said guide means comprises two members of U-shaped cross-section mounted on said undersurface and having recesses facing one another, each of said recesses guidingly receiving one of said sides.

4. The invention of claim 1, wherein said magnifying glass has a handle.

5. In combination, a shelf having an upper surface and an undersurface, and a magnifying glass movably received in guide means mounted on said undersurface.

6. The invention of claim 5, wherein said guide means comprise two spaced guide members slidably receiving side edges of said magnifying glass.

7. The invention of claim 6, wherein each of said guide members comprises an elongated track of U-shaped cross-section.

* * * * *